W. F. SHAW.
Lamp Burner.
No. 22,516.  Patented Jan'y 4, 1859.
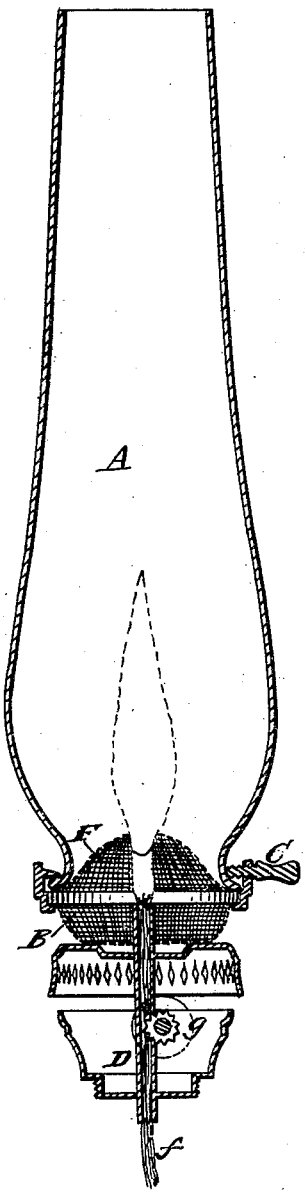
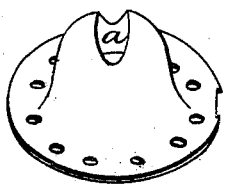
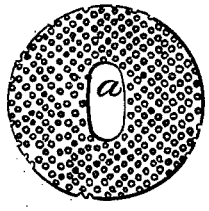
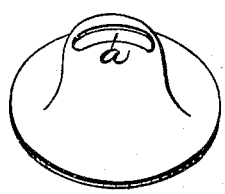
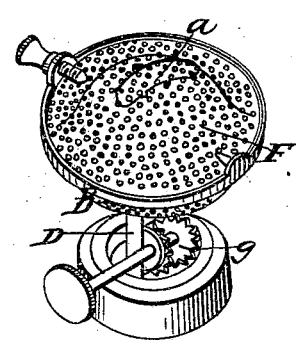
Witnesses:
Inventor:
Wm F Shaw

UNITED STATES PATENT OFFICE.

WM. F. SHAW, OF BOSTON, MASSACHUSETTS.

LAMP.

Specification of Letters Patent No. 22,516, dated January 4, 1859.

*To all whom it may concern:*

Be it known that I, WM. F. SHAW, of Boston, in the county of Suffolk and State of Massachusetts, have invented an Improved Deflector for Kerosene, Coal-Oil, Solar, and other Similar Lamps, of which the following is a full, clear, and exact description, reference being had to the accompanying drawings, making part of this specification, in which—

Figure 1, is a section through a lamp cap and chimney with my improved deflector attached. Fig. 2, a view in which is represented a modification of my deflector. Figs. 3 and 4 detached views of the deflectors, and Figs. 5 and 6 old forms of deflectors to be referred to hereafter.

The deflectors heretofore employed on lamps of this description have been made of sheet metal as represented in Fig. 5, the air for the support of the combustion being admitted to the air chamber beneath the deflector from which it passes through the opening $a$ in the top of the deflector to the flame, a violent draft was thus produced through the opening in the deflector which was not conducive to perfect combustion, and a deficient light was the result. Deflectors of this description have been perforated with holes $c$, near their base, as in Fig. 6 but this has failed to produce the result which I have in view *i. e.*, to insure a more moderate draft through the principal opening in the deflector, and at the same time to furnish an increased supply of oxygen to the flame.

After repeated experiments having for their object to discover the best form of deflector for the accomplishment of the above end and for the production of the maximum quantity of light from a given quantity and quality of burning material, I have discovered that a deflector made of finely perforated sheet metal or of fine wire gauze is eminently calculated to insure these ends.

To enable others skilled in the art to understand my invention I will proceed to describe the manner in which I have carried it out.

In the accompanying drawings A, is the chimney which is secured to the holder B, by the screw C. The bottom of the chimney holder is made of perforated metal (as in Fig. 2) or of wire gauze (as in Fig. 1) for the purpose of admitting the air for the supply of the combustion uniformly and steadily to the air chamber beneath the deflector, the wick $f$, within the tube D, is raised or lowered in the ordinary manner by toothed wheels $g$, operated in the customary manner, these details however form no part of my present invention and need not therefore be further described.

The deflector F, is made of fine wire gauze and is seen detached in Fig. 3, or it may be made of finely perforated sheet metal (Fig. 4). Through the foraminous deflector thus produced a steady and uniform current of air is established from the air chamber below, the air being partially heated within the chamber and still more so by its passage through the meshes or holes in the deflector. The deflector thus without losing its distinctive character as such becomes at the same time a disseminator for the purpose of furnishing a uniform current of air to the flame and of moderating the draft through the principal opening $a$. A more perfect combustion is thus insured and the brilliancy of the flame is greatly increased.

The union of the perforated bottom air chamber and the perforated deflector conduces materially to the steadiness of the flame which is thus protected from drafts of air produced by the motion of the lamp or of persons or objects near it and thus the burning of those oils which are easily caused to smoke by puffs of air or partial drafts is greatly facilitated.

Thus far the foraminous deflector has been spoken of as particularly applicable to lamps but it is obvious that it may with equal advantage be employed in connection with gas burners. I do not therefore intend to confine myself to its use in the peculiar lamp above described but intend to apply it wherever it may be found to be useful.

I am aware that deflectors have been perforated with holes near their base, the body of the deflector being of unperforated sheet metal but I lay no claim to such a deflector as it would not accomplish the ends which I have in view but What I do claim as my invention and desire to secure by Letters Patent is—

1. The foraminous deflector herein described, operating in the manner substantially as set forth.

2. I claim the foraminous deflector in combination with the perforated bottom air chamber as set forth.

WM. F. SHAW.

Witnesses:
P. E. TESCHEMACHER,
J. FRANCIS LORING.